(12) United States Patent
Ubhayakar et al.

(10) Patent No.: US 12,313,234 B2
(45) Date of Patent: May 27, 2025

(54) BUMPER LENS UNIT OF A VEHICLE

(71) Applicant: Volvo Truck Corporation, Gothenburg (SE)

(72) Inventors: Chinmay Ubhayakar, Bangalore (IN); Mini Simon, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 427 days.

(21) Appl. No.: 17/788,012

(22) PCT Filed: Dec. 21, 2020

(86) PCT No.: PCT/EP2020/087421
§ 371 (c)(1),
(2) Date: Jun. 22, 2022

(87) PCT Pub. No.: WO2021/130159
PCT Pub. Date: Jul. 1, 2021

(65) Prior Publication Data
US 2023/0039226 A1    Feb. 9, 2023

(30) Foreign Application Priority Data
Dec. 25, 2019    (IN) .............................. 201921053838

(51) Int. Cl.
*B60Q 1/02*    (2006.01)
*B60Q 1/04*    (2006.01)
(Continued)

(52) U.S. Cl.
CPC ............ *F21S 41/25* (2018.01); *B60Q 1/0458* (2013.01); *F21S 41/295* (2018.01)

(58) Field of Classification Search
CPC ........ B60Q 1/0458; F21S 41/25; F21S 41/295
(Continued)

(56) References Cited

U.S. PATENT DOCUMENTS

2003/0043592 A1    3/2003    Skirha, III et al.
2003/0108704 A1    6/2003    Yano et al.
(Continued)

FOREIGN PATENT DOCUMENTS

DE    19928208 A1    12/2000
DE    102004039004 A1    2/2006
(Continued)

OTHER PUBLICATIONS

O'Brien et al. Nanocomposite Interphases for Improved Transparent Polymer Composite Materials; Army Research Laboratory report ARL-TR-4527 (Year: 2008).*
(Continued)

*Primary Examiner* — Christopher M Raabe
(74) *Attorney, Agent, or Firm* — Withrow & Terranova, PLLC

(57) ABSTRACT

Bumper lens unit of a vehicle, the bumper lens unit comprising a frame panel; a lens, the lens comprising a composite material which is transparent, the composite material comprising a resin and fibers, in which the refractive index of the resin matches with a refractive index of the fibers, in which nano-particles interphases are arranged around the fibers, a refractive index of the nano-particles interphases is between the refractive index of the resin and the refractive index of the fibers; a structural adhesive, the frame panel and the lens are bonded to each other by the structural adhesive whereby a front wall of the bumper lens unit is flush in the vicinity of a junction between the frame panel and the lens.

11 Claims, 4 Drawing Sheets

(51) Int. Cl.
*F21S 41/25* (2018.01)
*F21S 41/29* (2018.01)

(58) Field of Classification Search
USPC .......................................................... 362/538
See application file for complete search history.

(56) References Cited

U.S. PATENT DOCUMENTS

| | | |
|---|---|---|
| 2003/0191222 A1 | 10/2003 | Suzuki et al. |
| 2008/0043483 A1 | 2/2008 | Effner et al. |
| 2016/0221298 A1* | 8/2016 | Teutsch ............... B29C 48/2886 |
| 2017/0321864 A1 | 11/2017 | Dellock et al. |
| 2019/0284329 A1* | 9/2019 | Niegemeier ....... C08G 18/7664 |

FOREIGN PATENT DOCUMENTS

| | | |
|---|---|---|
| DE | 102006055996 A1 | 5/2008 |
| DE | 202017102572 U1 | 5/2017 |
| FR | 2925417 A1 | 6/2009 |
| WO | 2019224387 A1 | 11/2019 |

OTHER PUBLICATIONS

Loste, J. et al., "Transparent polymer nanocomposites: An overview on their synthesis and advanced properties," Progress in Polymer Science, vol. 89, Feb. 2019, pp. 133-158.
International Search Report and Written Opinion for International Patent Application No. PCT/EP2020/087421, mailed Apr. 9, 2021, 12 pages.

* cited by examiner

BUMPER LENS UNIT OF A VEHICLE

This application is a 35 USC 371 national phase filing of International Application No. PCT/EP2020/087421, filed Dec. 21, 2020, which claims the benefit of Indian Patent Application number 201921053838, filed Dec. 25, 2019, the disclosures of which are incorporated herein by reference in their entireties.

FIELD OF THE INVENTION

This invention relates to a bumper lens unit of a vehicle, in particular of a heavy vehicle.

This invention also relates to a headlamp bumper assembly comprising such a bumper lens unit and to a bumper of a vehicle, in particular of a heavy vehicle, comprising such a headlamp bumper assembly

BACKGROUND OF THE DISCLOSURE

The bumper of a vehicle, in particular of a heavy vehicle, usually comprises openings into which are positioned headlamps. Such a bumper is often made of plastic or composite material and the bumper is also often painted.

Each headlamp generally comprises a lens for protecting a light source. The lens commonly comprises a vitreous thermoplastic polycarbonate. The thermoplastic polycarbonate is coated with a lacquer providing enhanced abrasion and scratch resistance.

The lens is often attached to the bumper. In most cases, the lens is fastened to the bumper by use of bolts. In some other cases, the lens is bonded to the bumper.

However, the lens requires a clean surface condition to endure the hard-coating process. Therefore, the attachment between the bumper and the lens requires a gap there between. The gap affects the aerodynamic behavior of the vehicle.

Attempts have already been made to reduce the effect of the gap by using a seal between the bumper and the lens.

However, that solution only solves partially the issue because such a seal is subject to aging phenomenon and still creates asperities on the front surface of the bumper. Also, adding a seal makes the assembly more complex, increasing time and cost of assembly.

The present disclosure aims to solve these disadvantages. The present disclosure provides a bumper lens unit improving further the aerodynamic behavior of the vehicle.

SUMMARY OF THE DISCLOSURE

According to one aspect of the present invention, it is disclosed a bumper lens unit of a vehicle, the bumper lens unit comprising:
  a frame panel,
  a lens, the lens comprising a composite material which is transparent, the composite material comprising a resin and fibers, in which the refractive index of the resin matches with a refractive index of the fibers, in which nano-particles interphases are arranged around the fibers, a refractive index of the nano-particles interphases is between the refractive index of the resin and the refractive index of the fibers,
  a structural adhesive, the frame panel and the lens are bonded to each other by the structural adhesive,
whereby a front wall of the bumper lens unit is flush in the vicinity of a junction between the frame panel and the lens.

The term "match" means that the refractive index of the resin is as close as possible to the refractive index of the fibers. However a slight disparity may exist between the refractive indexes of the resin and the fibers due to temperatures dependence or precision tolerances.

The term "junction" refers here to portions of the frame panel and the lens being configured to cooperate with each other.

The term "flush" refers to a surface that is flat and even.

The composite material of the lens is bonded to the frame panel by use of structural adhesive forming a flush front wall of the bumper lens unit. Therefore, the junction between the lens and the frame panel is free of any gap. The junction provides a hermetic closure between the lens and the frame panel. Therefore, the bumper lens unit does not involve the use of a seal. Consequently, the aerodynamic behavior of the vehicle is improved.

The nano-particles interphases create a smooth transition for light rays passing through the resin and the fibers. Therefore, the overall transmittance of the composite material is improved over a wide range of temperatures. It is meant here by "transmittance", the ratio between the amount of light rays entering the lens and the amount of light rays transmitted by the lens towards the front of the vehicle.

According to one aspect, the frame panel comprises plastic or composite material.

Such materials of the frame panel are lightweight and show a high shock and abrasion resistance.

According to one aspect, the resin of the composite material is epoxy-based.

According to another aspect, the resin of the composite material comprises a thermoplastic polymer or a thermosetting polymer.

Such materials of the resin are lightweight and show superior scratch and abrasion resistance properties. These materials also show high transparency properties. Such materials may also have a low viscosity allowing a wide variety of manufacturing process to be used to produce the composite material.

According to one aspect, the fibers of the composite material are glass fibers.

Glass fibers have high transparency properties. They also have a refractive index close to the refractive index of the resin, improving the overall transmittance of the composite material.

Preferably, a volume fraction of the glass fibers of the lens is comprised between 35% and 50%.

The volume fraction of glass fibers comprised in such a range improves impact resistance of the composite material.

According to one aspect, nano-particles interphases comprise colloidal silica sol nano-particles.

According to one aspect, the transparent composite material of the lens further comprises at least one additive for UV resistance.

Such an additive preserves the lens from yellowing and deteriorations due to UV radiations.

According to a first embodiment, the junction between the frame panel and the lens is a butt joint between an internal edge of the frame panel and an external edge of the lens.

The term "butt joint" refers to a junction where an internal wall of the frame panel faces an external wall of the lens.

The first embodiment provides an arrangement which is easy and quick to assemble.

According to a second embodiment, the junction between the frame panel and the lens comprises a channel provided by one among an internal edge of the frame panel and an external edge of the lens, and a protrusion provided by the other one among the internal edge of the frame panel and the external edge of the lens, the protrusion being received inside the channel.

The second embodiment provides an improved hermetic closure between the frame panel and the lens.

According to a third embodiment, the junction between the frame panel and the lens is a lap joint between an internal edge of the frame panel and an external edge of the lens.

The term "lap joint" refers to a junction where the internal edge of the frame panel overlaps the outer edge of the lens.

The disclosure is also directed to a headlamp bumper assembly of a vehicle, the headlamp bumper assembly comprising an optical unit and the bumper lens unit as described above, the optical unit comprising a housing and a reflector, the reflector is received inside the housing, the housing of the optical unit is fixed to the lens such that light emitted by the reflector is directed towards the lens.

According to one aspect of the headlamp bumper assembly, the lens comprises Z portion, the housing of the optical unit comprises a groove, an end of the Z portion is fixed inside the groove of the housing of the optical unit.

The disclosure is also directed to a bumper of a vehicle, the bumper comprising the headlamp bumper assembly as described above and at least one among a center bumper and a rear reinforcement structure, the headlamp bumper assembly is fixed to at least one among the center bumper and the rear reinforcement structure.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements.

Note that in the figures, structural and/or functional elements common to the various embodiments may have the same references. Unless otherwise indicated, such elements therefore have identical structural, dimensional, and material properties.

For clarity, only those elements useful to understanding the described embodiments have been represented and will be detailed.

Figure 1:
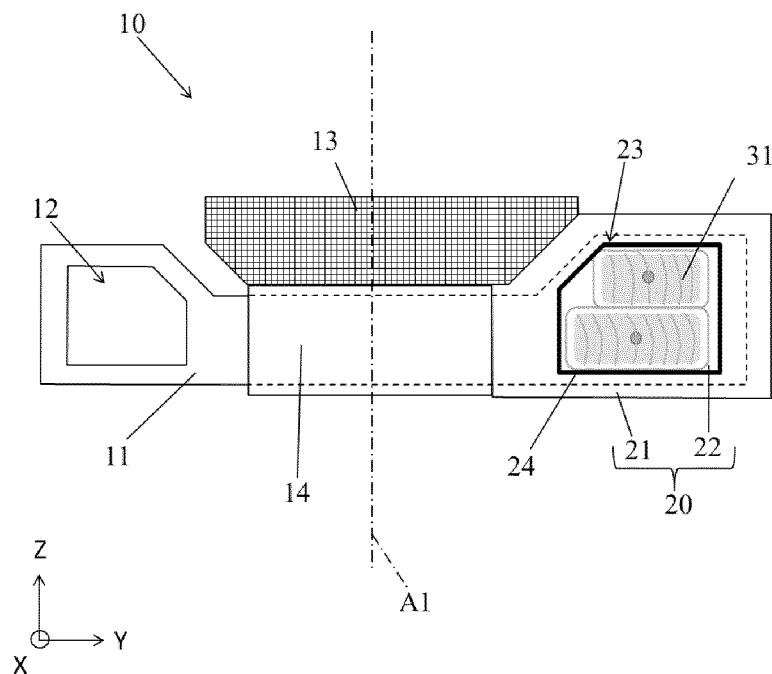
FIG. 1 is a simplified illustration of a bumper of vehicle.

FIG. 1 shows a bumper 10 of a vehicle. The vehicle is here a heavy vehicle such as a truck. Other vehicles may be suitable to comprise such a bumper 10. A non-exhaustive list of such vehicles comprises vans, transit cars and construction equipment vehicles.

In the following description, when reference is made to absolute positional qualifiers such as the terms 'front', 'back', 'top', 'bottom', 'left', 'right', etc., or to relative qualifiers such as the terms 'above', 'below', 'higher', 'lower', 'ahead', 'behind', etc., or to orientation qualifiers, these are in reference to the vehicle, in the ordinary travel direction of the vehicle.

In the following, the longitudinal direction X is the longitudinal direction of the vehicle. This longitudinal direction X corresponds to the normal travel direction of the vehicle. The transverse direction Y is the transverse direction of the vehicle or lateral direction of the vehicle. This transverse direction corresponds to a direction perpendicular to the normal direction of travel of the vehicle. Finally, the vertical direction Z is a vertical direction of the vehicle, perpendicular to the longitudinal direction X and transverse direction Y.

The bumper 10 is a front bumper. The bumper 10 first comprises a rear reinforcement structure 11. The rear reinforcement structure 11 is attached or integrated to the front end of the vehicle. The rear reinforcement structure 11 extends according to the transversal direction Y from a right side of the vehicle to a left side of the vehicle. The rear reinforcement structure 11 extends between a right end and a left end. The rear reinforcement structure 11 is intended to protect the vehicle's body and the engine in a slight collision. Each of the right and left ends of the rear reinforcement structure 11 comprises an opening 12.

The bumper 11 also comprises a front panel 13. The front panel 13 is located above the rear reinforcement structure 11. The front panel 13 has a grille. The grille is a radiator of an engine cooling system of the vehicle.

The bumper 11 comprises a center bumper panel 14. The center bumper panel 14 is positioned in front of a central portion of the rear reinforcement structure 11.

As illustrated in FIG. 1, the bumper 10 further comprises a bumper lens unit 20. The illustrated bumper lens unit 20 is here a left bumper lens unit positioned ahead of the left end of the rear reinforcement structure 11.

A right bumper lens unit, not shown in FIG. 1, may also be positioned ahead of the right end of the rear reinforcement structure 11. The left and right bumper lens units are symmetrical through a transversal plane A1 passing by the middle of the vehicle and for which the transversal direction Y is perpendicular. In the following, it is described a bumper lens unit 20 showing all features of the left and right bumper lens unit.

The bumper lens unit 20 comprises a frame panel 21. The frame panel 21 is a rigid structure. The frame panel 21 is made of plastic or composite material. The frame panel 21 may be attached to the center bumper panel 14 by a first set of mountings. The frame panel 21 may also be attached to the rear reinforcement structure 11 by a second set of mounting. The frame panel 21 defines an opening.

The bumper lens unit 20 also comprises a lens 22. The lens 22 is surrounded by the frame panel 21. The lens 22 is also fixed to the frame panel 21. The lens 22 is intended to be positioned ahead of an optical unit 30 as it will be described hereinafter. The lens 22 is intended to protect the optical unit 30 while allowing the light produced by the optical unit 30 to pass through in order to illuminate the front of the vehicle at night. For that purpose, the lens 22 is also arranged to be aligned with one of the openings 12 of the rear reinforcement structure 11. In the illustrated example, the frame panel 21 is a corner panel of the bumper 10.

Figure 2:
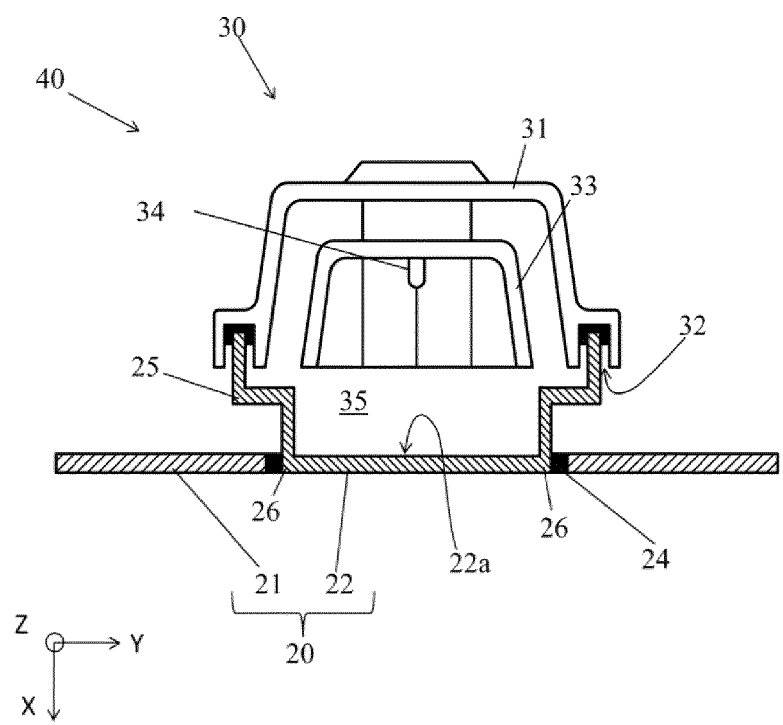
FIG. 2 is a simplified illustration of the headlamp bumper assembly of the bumper of FIG. 1.

FIG. 2 shows a headlamp bumper assembly 40. The headlamp bumper assembly 40 first comprises the bumper lens unit 20 as described above. The headlamp bumper assembly also comprises the optical unit 30. The optical unit 30 is positioned relatively to the rear of the lens 22. The optical unit 30 comprises a housing 31. The optical unit 30 further comprises a reflector 33 and a light source 34. The reflector 33 is fixed inside in the housing 31. The light source 34 is placed inside the reflector 33. The light source 34 produces light rays which are redirected by the reflector 33 towards the lens 22.

As illustrated in FIG. 2, the lens 22 comprises a Z portion 25. The Z portion 25 is a skirt having Z shape. The Z portion 25 extends from a rear wall 22a of the lens 22, especially at an external edge 26 of the lens 22. The Z portion 25 of the bumper lens unit 20 passes through the respective opening of the rear reinforcement structure 11. The housing 31 comprises a groove 32 for receiving an end of the Z portion 25 of the lens 22. The Z portion 25 of the lens 22 is bonded inside the groove 32 of the housing 31 by use of a hot-melt adhesive injected inside the groove 32. The Z portion 25 is intended to allow the attachment of the optical unit to the lens 22. The Z portion 25 defines a closed space 35 between the lens 22 and the optical unit 30. The Z portion 25 avoids any liquid or foreign objects to enter into the closed space 35.

Figure 3:
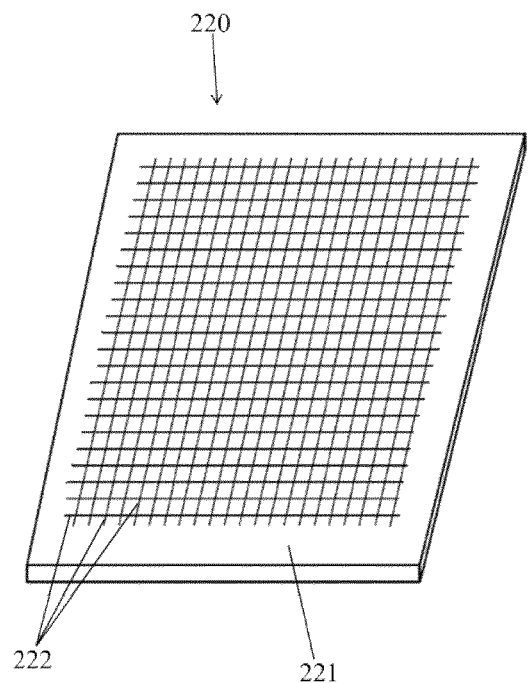
FIG. 3 is a simplified illustration of the composite material of the lens of the bumper of FIGS. 1 and 2.

The lens 22 is made of a composite material 220 shown in FIG. 3. The composite material 220 can be formed by embedding fibers 222 into a resin 221. The composite material 220 is here transparent. Light rays produced by the optical unit 30 may thus pass through the lens 22. For this purpose, the resin 221 and the fibers 222 are transparent.

The following is a preferred embodiment of the composite material 220.

In the preferred embodiment, the resin 221 may be a thermoset epoxy based resin. Alternatively, the resin 221 may be a blended epoxy resin. Alternatively, the resin 221 may be a thermoplastic. For example, the thermoplastic is poly(methyl methacrylate) (also called "PMMA"). Such a resin 221 has a high abrasion and scratch resistance.

In the preferred embodiment, the fibers 222 are glass fibers. As illustrated in FIG. 3, the fibers 222 have a 0/90° orientation. In other terms, the fibers 222 are arranged in successive layers, wherein the orientation of all the fibers 222 in a layer has either is alternated of 90° between two successive layers. Thus, the fibers 222 form a cross-hatch pattern in the resin 221. The fibers 222 are further continuous fibers. The composite material comprises between 35% and 50% of fibers 222 per volume.

Advantageously, the resin 221 has a low viscosity allowing a proper infusion of the fibers 222 into the resin to obtain the transparency of the composite material 220. This also enables to use a wide variety of processes to manufacture the composite material 220. Such processes may be vacuum assisted resin transfer molding or vacuum infusion process.

Such a composition of the composite material 220 ensures appropriate mechanical properties of the lens 22 in terms of impact resistance and structural strength. The composite material 220 may have an elastic modulus greater than 3500 MPa. Also, the composite material may have a Shore D hardness between 80 and 90. Therefore, the lens 22 is able to protect the optical unit 30 positioned behind from road projections for instance without being scratch or breaking.

The composite material 220 may also be tailored to show specific mechanical properties. For instance, the orientation of the fibers 222 does not impact the propagation of light across the composite material 220. Thus, other fibers pattern may be chosen. Also, other fibers form may be suitable for the composite material 220. For example, chopped fibers may be used. Also, volume fraction of the fibers 222 may also be adapted.

The composite material 220 may also comprise additional agents. For example, the composite material 220 may comprise at least one additive for UV resistance. It allows preserving the lens 22 from yellowing or from other deteriorations due to UV radiations.

Due to high impact resistance and structural strength of the composite material 220, the lens 22 does not require a hard coating anymore as it was required in the prior art. Therefore, the lens 22 is attached to the frame panel 21 by use of a structural adhesive 24 shown in FIGS. 1 and 2.

Figure 4:
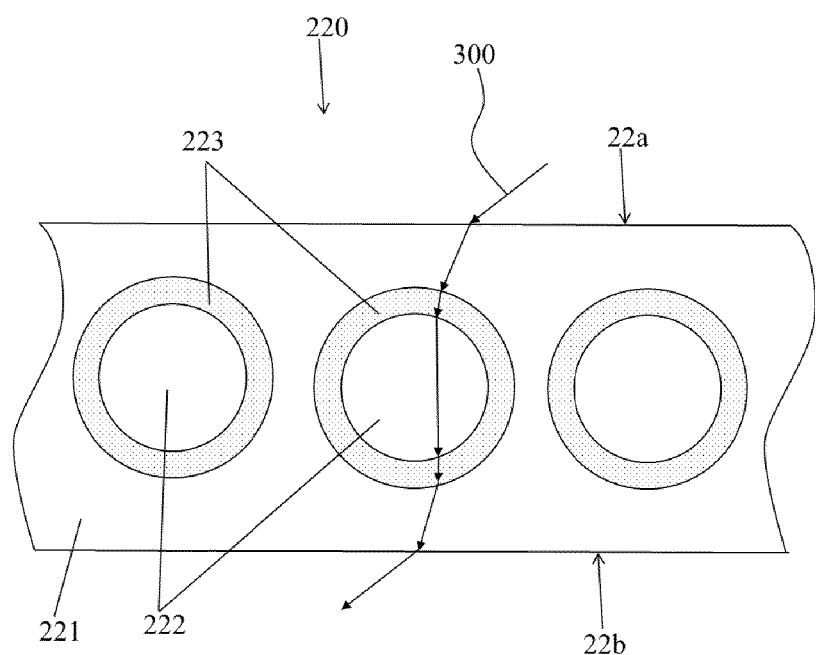
FIG. 4 is a simplified illustration of a portion of the composite material of FIG. 3.
Figure 4:
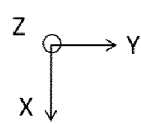

As shown in FIG. 4, the composite material 220 also comprises nano-particles interphases 223. A nano-particles interphase 223 is disposed around each fiber 222. For that purpose, the fibers 222 are coated with nano particles. Nano particles may be deposited using dip coating processes, multiple particles deposition processes or ionic self-assembly processes. Nano-particles interphases 223 form an intermediate material arranged between the resin 221 and the fibers 222. Nano-particles interphases 223 have a thickness comprised between 100 nm and 200 nm.

Here, the nano particles are colloidal silica sol. The size of the colloidal silica sol nano particles is around 20 nm. The composite material comprises up to 10% of nano particles per volume.

Besides, the refractive index of a material reflects how fast the light travels inside the material. The relative change of refractive index between two materials causes light rays to bend at the limit between the two materials. This well-known phenomenon is described by the Snell-Descartes's law. The resin 221 and the fibers 222 are selected such that a refractive index of the resin 221 matches with a refractive index of the fibers 222. In other words, the resin 221 and the fibers 222 are selected to have the same refractive index at a given temperature. The matching refractive index of the resin 221 and the fibers 222 is comprised between 1.50 and 1.56. In this disclosure, the refractive index of the resin 221 and the fibers 222 as described above is around 1.56.

However, the refractive index of the resin 221 may slightly differ from the refractive index of the fibers 222. For example, the refractive index of the resin 221 may differ from the refractive index of the fibers 222 due to precision tolerances. Also, the refractive index of the resin 221 may fluctuate as the temperature of the resin 221 changes. This may particularly occur as the vehicle operates outside and is subject to temperature variations. This may cause important loss of light transmittance across the lens 22. For example, a difference of 0.005 between the refractive index of the fibers 222 and the refractive index of the resin 221 may results in loss of 20% of the overall transmittance across the lens.

The nano-particles interphases 223 are selected to have an intermediate refractive index between the refractive index of the resin 221 and the refractive index of the fibers 222. Most preferably, the refractive index of the nano-particles interphases 223 is the average between the refractive index of the resin 221 and the refractive index of the fibers 222.

FIG. 4 shows the path of a light ray 300 across the composite material 220. The composite material 220 of FIG. 4 is a particular example wherein the composite material 220 comprises only one layer of fibers 222. The light ray 300 is emitted by the optical unit 30 located behind the lens 22. The light ray 300 is emitted toward the front of the vehicle. The light ray 300 enters the resin 221 of the composite material 220 through the rear wall 22a of the lens 22. As the light ray 300 enters the resin 221, the light ray 300 is bent due to the difference of refractive index between the air and the resin 221. Here, the light ray 300 passes through one fiber 222 and the nano-particles interphase 223 disposed around this fiber 222. Note that others light rays not shown in FIG. 4 may travel across the composite material 220 without passing through a fiber 222, or may travel across the composite material 220 by passing through multiple fibers 222 and nano-particles interphases 223, especially through multiple fibers 222 and nano-particles interphases 223 belonging to different layers of fibers 222.

As shown in FIG. 4, the light ray 300 is also bent as it enters the nano-particles interphase 223 from the resin 221. Additionally, the light ray 300 is also bent as it enters the fibers 222 from the nano-particles interphase 223. As the refractive index of the nano-particle interphase 223 is between the refractive indexes of the resin 221 and the fiber 222, the nano-particles interphase 223 creates a smooth transition between the resin 221 and the fiber 222. Advantageously, the light ray 300 is then less deviated as it would have been by entering directly the fiber 222 from the resin 221. The light ray 300 is finally bent another time as it exits respectively the fiber 222, the nano-particles interphase 223 and the resin 221. Once the light ray 300 exits a front wall 22b of the lens 22, the light ray 300 is directed towards the front of the vehicle.

Therefore, light rays passing through the composite material 220 are less subject of being deviated in such a way that they are not transmitted by the lens 22 towards the front of the vehicle. The nano-particles interphases 223 improve the overall transmittance of the composite material 220, especially over a wider range of temperatures.

The nano-particles interphases 223 also allow reducing the coefficient of thermal expansion of the composite material 220, especially in the preferred embodiment of the resin 221 being epoxy based.

Figure 5:
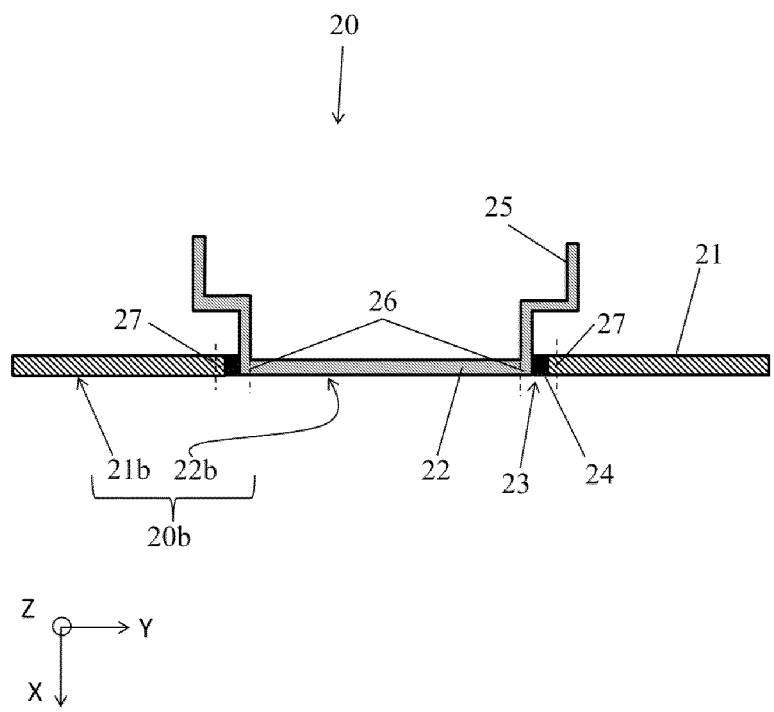
FIG. 5 is a simplified illustration of a cross section of the bumper lens unit of the bumper of FIGS. 1 and 2.

FIG. 5 shows a cross section of the bumper lens unit 20. The lens 22 is bonded to the frame panel 21 at a junction 23. The junction 23 defines a space formed between an internal edge 27 of the frame panel 21 and the external edge 26 of the lens 22. The space is filled with the structural adhesive 24 for bonding together the frame panel 21 and the lens 22. One can notice that the junction 23 provides a hermetic closure. Also, the junction 23 allows that a front wall 21b of the frame panel 21 and the front wall 22b of the lens 22 are at the same level, providing a front wall 20b of the bumper lens unit 20 which is flush. The front wall 20b of the bumper lens unit 20 is also free of gaps. These advantageous features improve the overall aerodynamic behavior of the vehicle.

In a first embodiment of the junction 23 shown in FIG. 5, the junction 23 between the frame panel 21 and the lens 22 is a butt joint. It is meant by butt joint that the space is formed according to the transversal direction Y between an internal wall of the internal edge 27 of the frame panel 21 and an external wall of the external edge 26 of the lens 22. A butt joint type junction 23 allows a quick attachment between the frame panel 21 and the lens 22.

Figure 6A:
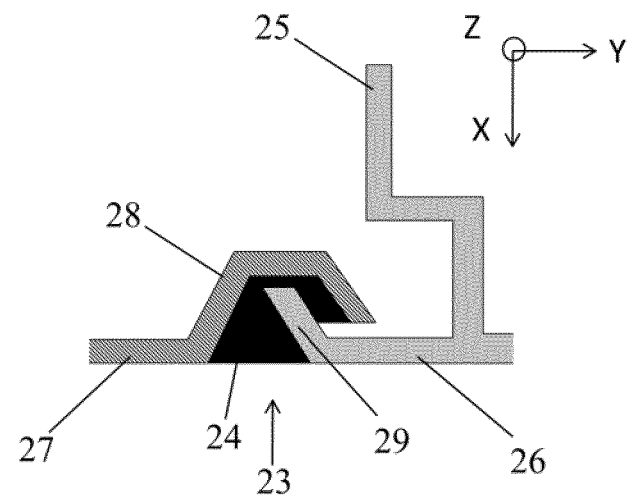
FIG. 6a is a simplified illustration of a second embodiment of the junction of the bumper lens unit of FIG. 5.

FIG. 6a shows a second embodiment of the junction 23 between the frame panel 21 and the lens 22. In the second embodiment of the junction 23, the internal edge 27 of the frame panel 21 forms a channel 28. The external edge 26 of the lens 22 comprises a protrusion 29. The protrusion 29 is received inside the channel 28. For that purpose, the protrusion 29 is substantially oriented towards the rear. The space is then formed between the channel 28 and the protrusion 29. In particular, the adhesive 24 is disposed on each sides of the protrusion 29 according to the transversal direction Y.

Figure 6B:
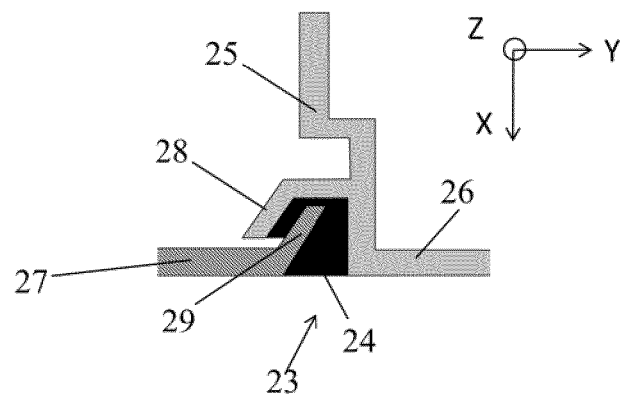
FIG. 6b is a simplified illustration of a third embodiment of the junction of the bumper lens unit of FIG. 5.

FIG. 6b shows a third embodiment of the junction 23. The third embodiment of the junction 23 only differs from the second embodiment in that the channel 28 is formed by the external edge 26 of the lens 22 and the protrusion 29 is formed by the internal edge 27 of the frame panel 21.

The second and third embodiments of the junction 23 provide an improved hermetic closure between the frame panel 21 and the lens 22.

Figure 6C:
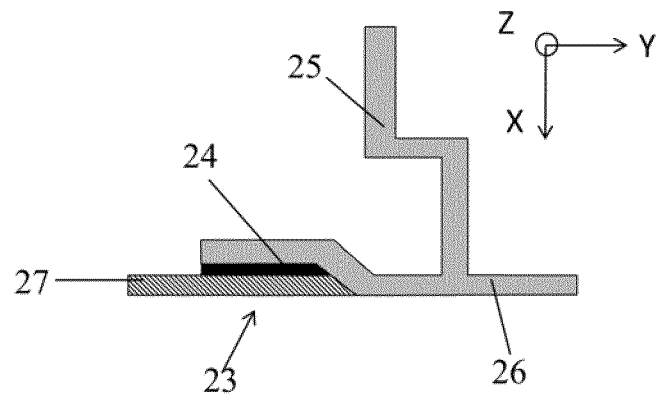
FIG. 6c is a simplified illustration of a fourth embodiment of the junction of the bumper lens unit of FIG. 5.

FIG. 6c shows a fourth embodiment of the junction. The fourth embodiment of the junction 23 is a lap joint. It is meant by lap joint that the external edge 26 of the lens 22 overlaps the internal edge 27 of the frame panel 21. Here, the internal edge 27 of the frame panel 21 is positioned ahead of the external edge 26 of the lens 22. Therefore, the space is formed between the internal edge 27 of the frame panel 21 and the external edge 26 of the lens 22 according to the longitudinal direction X. Alternatively, the lap joint may have the opposite configuration where the external edge 26 of the lens 22 is positioned ahead of the internal edge 27 of the frame panel 21.

Obviously, the disclosure is not limited to the sole example described previously. For example, all the features of the bumper 10 as described above may be suitable to a rear bumper.

The invention claimed is:

1. A bumper lens unit of a vehicle, the bumper lens unit comprising:
    a frame panel,
    a lens, the lens comprising a composite material which is transparent, the composite material comprising:
        a resin,
        fibers, and
        nano-particles interphases arranged around the fibers,
        wherein a refractive index of the resin matches with a refractive index of the fibers, and a refractive index of the nano-particles interphases is between the refractive index of the resin and the refractive index of the fibers, and
    a structural adhesive,
    wherein the frame panel and the lens are bonded to each other by the structural adhesive,
    wherein a front wall of the bumper lens unit is flush in the vicinity of a junction between the frame panel and the lens,
    wherein the junction between the frame panel and the lens comprises a channel in one of an internal edge of the frame panel or an external edge of the lens, and comprises a protrusion projecting from the other of the internal edge of the frame panel or the external edge of the lens, with the protrusion being received inside the channel, and
    wherein a space is formed between the channel and the protrusion, the space being filled with the structural adhesive.

2. The bumper lens unit of claim 1, wherein the frame panel comprises plastic or composite material.

3. The bumper lens unit of claim 1, wherein the resin of the composite material is epoxy-based.

4. The bumper lens unit of claim 1, wherein the resin of the composite material comprises a thermoplastic polymer or a thermosetting polymer.

5. The bumper lens unit of claim 3, wherein the fibers of the composite material are glass fibers.

6. The bumper lens unit of claim 5, wherein a volume fraction of the glass fibers for the lens is between 35% and 50%.

7. The bumper lens unit of claim 5, wherein the nanoparticles interphases comprise colloidal silica sol nanoparticles.

8. The bumper lens unit of claim 1, wherein the composite material of the lens further comprises at least one additive configured to enhance UV resistance.

9. A headlamp bumper assembly of a vehicle, the headlamp bumper assembly comprising:
   an optical unit, and
   the bumper lens unit of claim 1,
   wherein the optical unit comprises:
      a housing, and
      a reflector,
      wherein the reflector is received inside the housing, and
      wherein the housing of the optical unit is fixed to the lens such that light reflected by the reflector is directed towards the lens.

10. The headlamp bumper assembly of claim 9, wherein the lens comprises a Z portion, the housing of the optical unit comprises a groove, and an end of the Z portion is fixed inside the groove of the housing.

11. A bumper of a vehicle, the bumper comprising the headlamp bumper assembly of claim 9 and one of a center bumper or a rear reinforcement structure, the headlamp bumper assembly being fixed to the center bumper or the rear reinforcement structure.

* * * * *